US010317952B2

(12) United States Patent
Iyer et al.

(10) Patent No.: US 10,317,952 B2
(45) Date of Patent: Jun. 11, 2019

(54) COMPARTMENT FOR MAGNET PLACEMENT (71) Applicant: INTEL CORPORATION, Santa Clara, CA (US)

(72) Inventors: Sandeep S. Iyer, Chandler, AZ (US); Amanuel Abebaw, Chandler, AZ (US); Mark Saltas, Chandler, AZ (US); Mayank Patel, Chandler, AZ (US); Charavana K. Gurumurthy, Gilbert, AZ (US); Suriyakala Ramalingam, Chandler, AZ (US); Vladimir Malamud, Hedera (IL)

(73) Assignee: Intel Corporation, Santa Clara, CA (US)

(*) Notice: Subject to any disclaimer, the term of this patent is extended or adjusted under 35 U.S.C. 154(b) by 119 days.

(21) Appl. No.: 15/282,950

(22) Filed: Sep. 30, 2016

(65) Prior Publication Data

US 2018/0095503 A1 Apr. 5, 2018

(51) Int. Cl.
*G06F 1/16* (2006.01)
*H01F 7/02* (2006.01)

(52) U.S. Cl.
CPC .......... *G06F 1/1684* (2013.01); *H01F 7/0252* (2013.01)

(58) Field of Classification Search
CPC ....... G06F 1/1684; G06F 1/1626; H01F 7/021
USPC ...................................... 361/679.3
See application file for complete search history.

(56) References Cited

U.S. PATENT DOCUMENTS

| 6,177,745 | B1* | 1/2001 | Narita | H02K 1/2766 310/156.43 |
| 6,329,734 | B1* | 12/2001 | Takahashi | H02K 1/246 310/156.07 |
| 6,972,890 | B2* | 12/2005 | Matsui | G02B 26/085 359/290 |
| 6,972,943 | B2* | 12/2005 | Kato | H01G 9/012 257/E23.043 |
| 7,205,695 | B2* | 4/2007 | Smith | G01N 29/041 310/156.38 |
| 8,681,501 | B2* | 3/2014 | Govindasamy | G06F 1/203 174/16.3 |

(Continued)

FOREIGN PATENT DOCUMENTS

WO 2013165543 11/2013

OTHER PUBLICATIONS

International Search Report and Written Opinion for International Patent Application No. PCT/US17/49020 dated Dec. 7, 2017.

*Primary Examiner* — Rockshana D Chowdhury
(74) *Attorney, Agent, or Firm* — Green, Howard & Mughal LLP.

(57) ABSTRACT

An apparatus is provided which comprises: a chassis compartment having a bottom surface and walls orthogonal to the bottom, wherein the chassis compartment comprises: a rectangular opening, which may be designed to accept a microelectromechanical (MEMS) device and four slots, which may be designed to accept one or more magnet(s), extending outwardly from the rectangular opening, wherein each of the slots comprises: an inner opening having a length coextensive with a side of the rectangular opening, and an outer opening having corresponding ends that extend a length of the outer opening beyond the length of the inner opening. Other embodiments are also disclosed and claimed.

16 Claims, 7 Drawing Sheets (56) References Cited

U.S. PATENT DOCUMENTS

| | | |
|---|---|---|
| 9,405,116 B2 | 8/2016 | Khechana et al. |
| 2006/0109335 A1 | 5/2006 | Turner et al. |
| 2010/0315938 A1* | 12/2010 | Ascanio ............... B81B 7/0051 |
| | | 369/126 |
| 2014/0204553 A1* | 7/2014 | Wolfel ................. H05K 1/0263 |
| | | 361/774 |
| 2014/0293145 A1* | 10/2014 | Jones .................... G06F 1/1626 |
| | | 349/12 |
| 2015/0136933 A1* | 5/2015 | Merzon ................ G06F 1/1626 |
| | | 248/450 |
| 2016/0154233 A1 | 6/2016 | Takimoto et al. |

* cited by examiner

COMPARTMENT FOR MAGNET PLACEMENT

BACKGROUND

Users of electronic devices have come to expect richer experiences in terms of perceptual computing, augmented reality, and user interaction, for example. Delivering these enhanced user interfaces and experiences require the integration of more components and devices. At the same time, however, users have come to expect devices that are slimmer and sleeker. Integrating more components and functionality into smaller chassis can present challenges from a manufacturing perspective, particularly when dealing with magnets that can be difficult to place accurately due to attractive/repulsive forces.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Chassis compartments for magnet placement are generally presented. In this regard, embodiments of the present invention enable accurate placement of magnets, for example adjacent to a microelectromechanical (MEMS) device as part of a perceptual computing solution. While it may seem that there is "wasted" space in some of the examples presented between the magnets and the compartment walls, this space is beneficial in dealing with magnetic forces for reliable manufacturability. After reviewing the examples presented hereinafter, variations may occur to one skilled in the art that don't deviate from the scope of the present invention.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

Figure 1A:
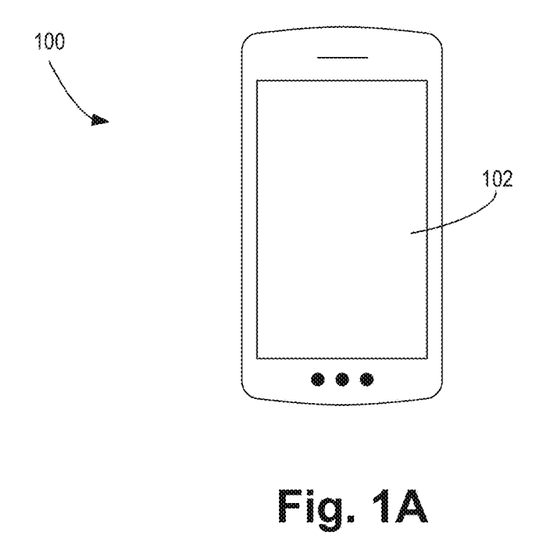
FIGS. 1A, 1B illustrate example electronic devices suitable for implementing a compartment for magnet placement, according to some embodiments.
Figure 1B:
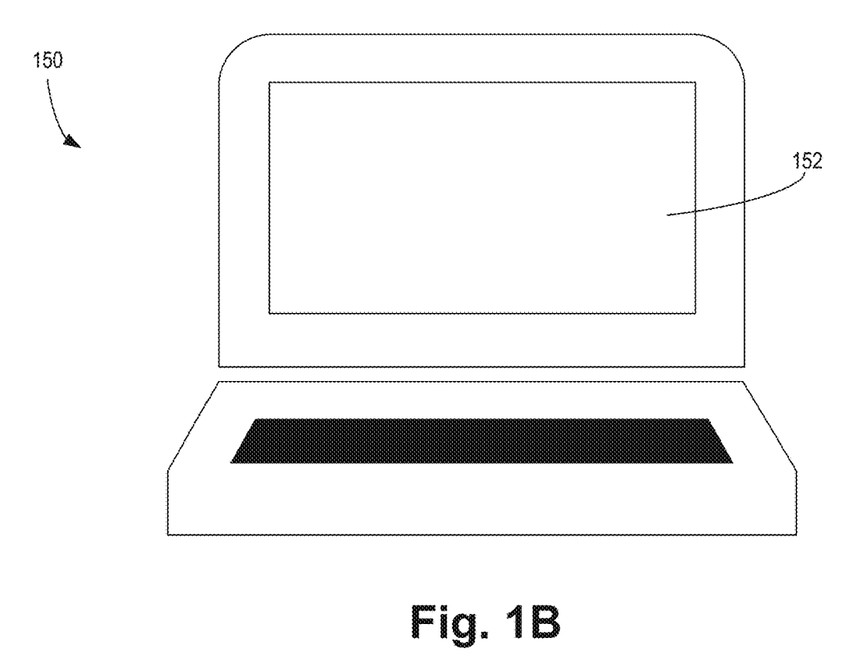

FIGS. 1A and 1B illustrate example electronic devices suitable for implementing a compartment for magnet placement, according to some embodiments. In other embodiments, the compartment for magnet placement, as described hereinafter, can be implemented in external peripheral devices or electronic devices of greater or lesser complexity.

FIG. 1A depicts a smartphone 100 including a display 102, while FIG. 1B depicts a personal computer (PC) 150 including a display 152. Smartphone 100 or PC 150 may include input/output features, such as a camera or accelerometer, that may require or benefit from internal magnets. As such, smartphone 100 and PC 150 may include a chassis compartment as described in more detail hereinafter.

Figure 2:
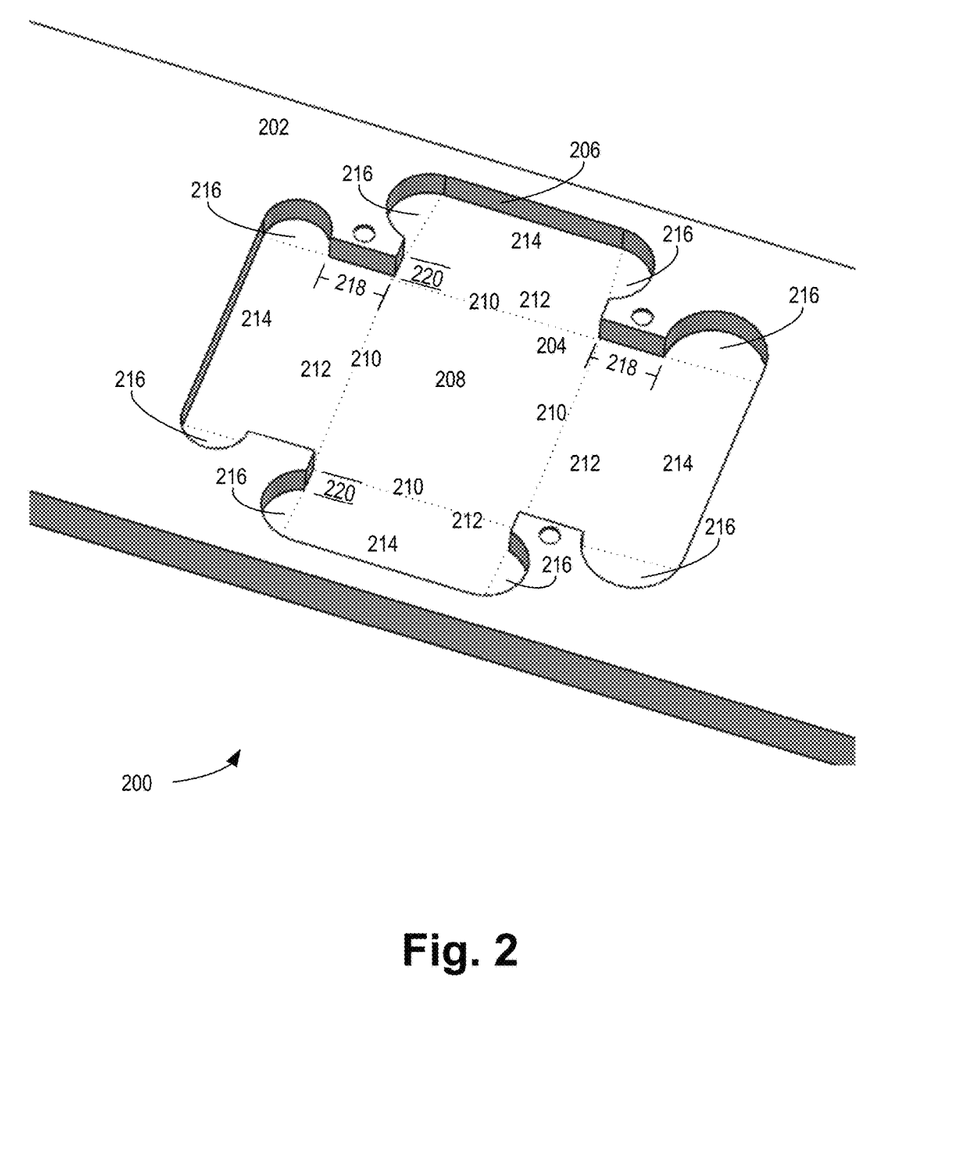
FIG. 2 illustrates a three-dimensional view of an example compartment for magnet placement, according to some embodiments.

FIG. 2 illustrates a three-dimensional view of an example compartment for magnet placement, according to some embodiments. As shown, chassis compartment 200 includes raised surface 202, bottom surface 204, compartment walls 206, rectangular opening 208, slots 210, slot inner openings 212, slot outer openings 214, slot outer opening ends 216, slot inner opening depth 218 and slot inner opening depth 220.

Raised surface 202 may extend any distance, perhaps only slightly, from compartment walls 206, and may either couple chassis compartment 200 with other chassis components or may itself be a structural chassis component. Bottom surface 204 may be smooth or rough and may include grooves as shown in more detail with reference to FIG. 3 to receive adhesive material. In some embodiments, bottom surface 204 and raised surface 202 are parallel to each other. Compartment walls 206 may be uniformly orthogonal to one or both of raised surface 202 and bottom surface 204, and may be made of metal, plastic or other material.

Chassis compartment 200 may include a central rectangular opening 208 with four slots 210 each extending outwardly from a side of rectangular opening 208. Each slot 210 may include a slot inner opening 212, which may be coextensive with a side of rectangular opening 208, and a slot outer opening 214. Slot outer openings 214 may have slot outer opening ends 216 that extend the length of slot outer opening 214 beyond the length of slot inner opening 212. While shown as being semi-circular in shape, slot outer opening ends 216 may be rectangular, triangular, or any other shape.

While shown as including one opposite pair of slots 210 having a slot inner opening depth 218 and the other opposite pair of slots 210 having a slot inner opening depth 220, in some embodiments each slot may have the same slot inner opening depth or each may have a different slot inner opening depth.

Figure 3:
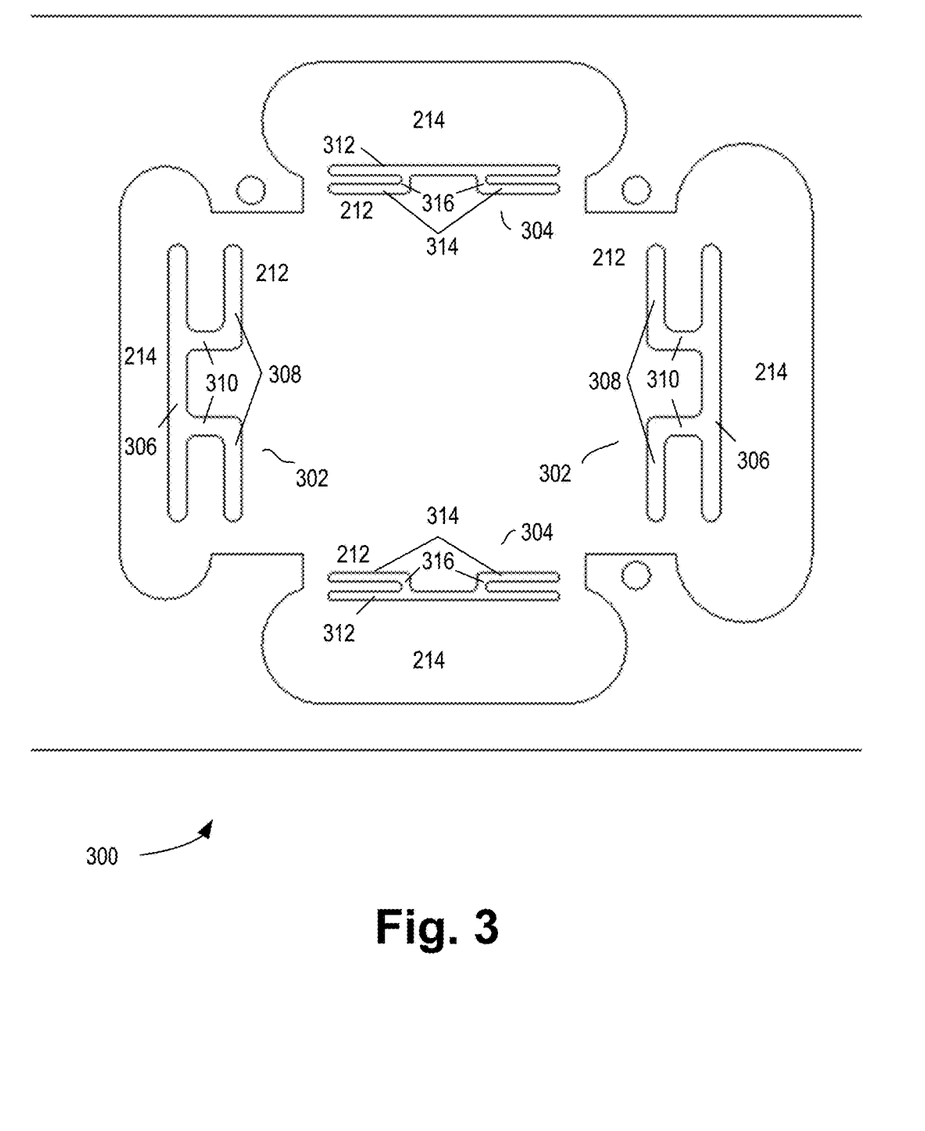
FIG. 3 illustrates an overhead view of an example compartment for magnet placement, according to some embodiments.

FIG. 3 illustrates an overhead view of an example compartment for magnet placement, according to some embodiments. As shown, chassis compartment 300 includes slot inner openings 212, slot outer openings 214, groove patterns 302 and 304, longer grooves 306 and 312, shorter grooves 308 and 314, and orthogonal grooves 310 and 316. In some embodiments, groove patterns 302 and 304 provide sites in bottom surface 204 where magnets are to be attached with adhesive, such as an epoxy. In this way, groove patterns 302 and 304 may contain adhesive such that an attached magnet is less likely to shift.

While shown as including one opposite pair of slots 210 having a groove pattern 302 and the other opposite pair of slots 210 having a groove pattern 304, in some embodiments each slot may have the groove pattern or each slot may have a different groove pattern.

In some embodiments, longer grooves 306 and 312 are present in slot outer openings 214, while shorter grooves 308 and 314 are present in slot inner openings 212. In some embodiments, each longer groove 306 is connected with two parallel shorter grooves 308 by orthogonal grooves 310, and each longer groove 312 is connected with two parallel shorter grooves 314 by orthogonal grooves 316. In some embodiments, orthogonal grooves 310 are longer than orthogonal grooves 316 so as to accommodate wider magnets. In some embodiments, ends of shorter grooves 308 and 314 may be coextensive with ends of longer grooves 306 and 312, respectively.

Figure 4:
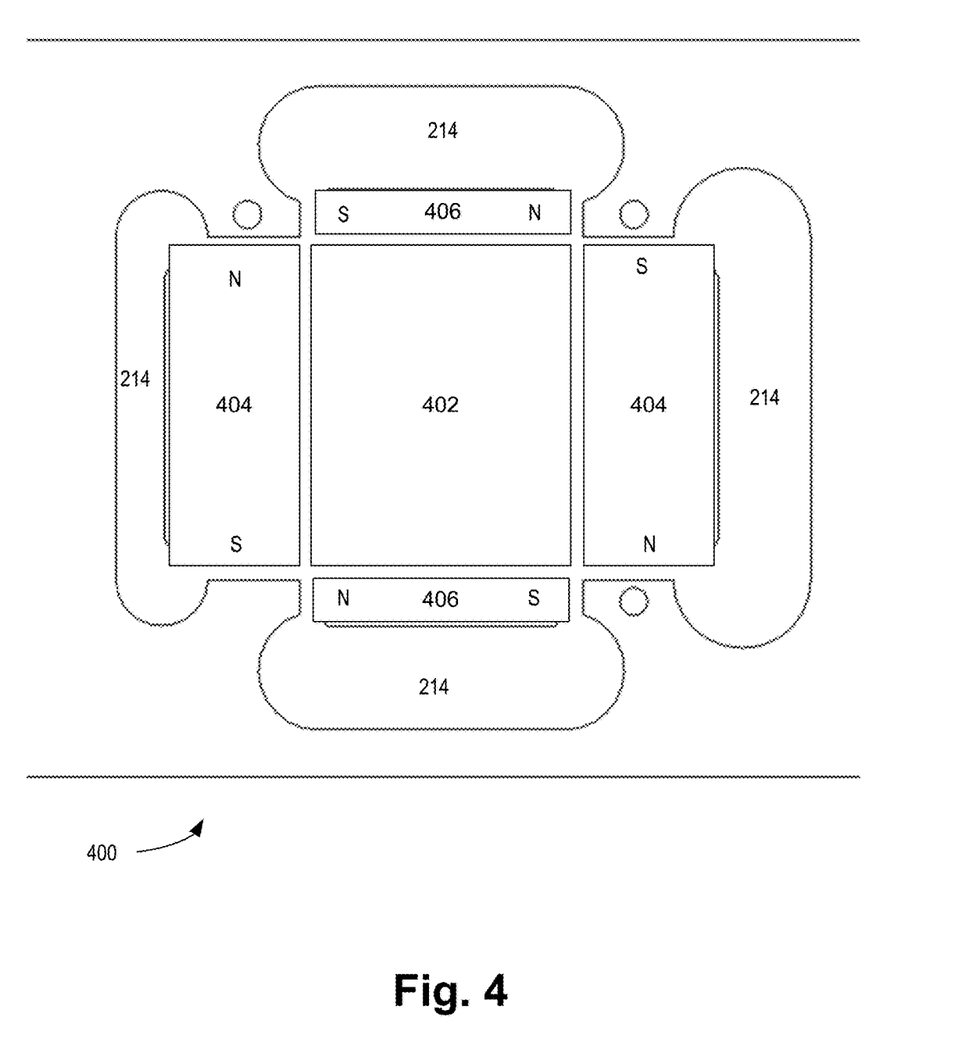
FIG. 4 illustrates an overhead view of an example populated compartment for magnet placement, according to some embodiments.

FIG. 4 illustrates an overhead view of an example populated compartment for magnet placement, according to some embodiments. As shown, chassis compartment 400 includes slot outer openings 214, device 402, and magnets 404 and 406.

In some embodiments, device 402 occupies rectangular opening 208 and is a microelectromechanical (MEMS) device that requires magnets to be present to fully function. Magnets 404 and 406 may occupy slots 210 adjacent to device 402. In some embodiments, magnets 404 and 406 extend from a side of device 402 to less than half way into slot outer openings 214, thereby creating space between magnets 404 and 406 and compartments walls 206.

While shown as including one opposite pair of slots 210 having a wider magnet 404 and the other opposite pair of slots 210 having a narrower magnet 406, in some embodiments each slot may have the same size magnet or each slot may have a different size magnet. In some embodiments, as shown, the magnets may be arranged so that the polarities of neighboring magnet ends are differing, thereby creating attractive forces.

Figure 5:
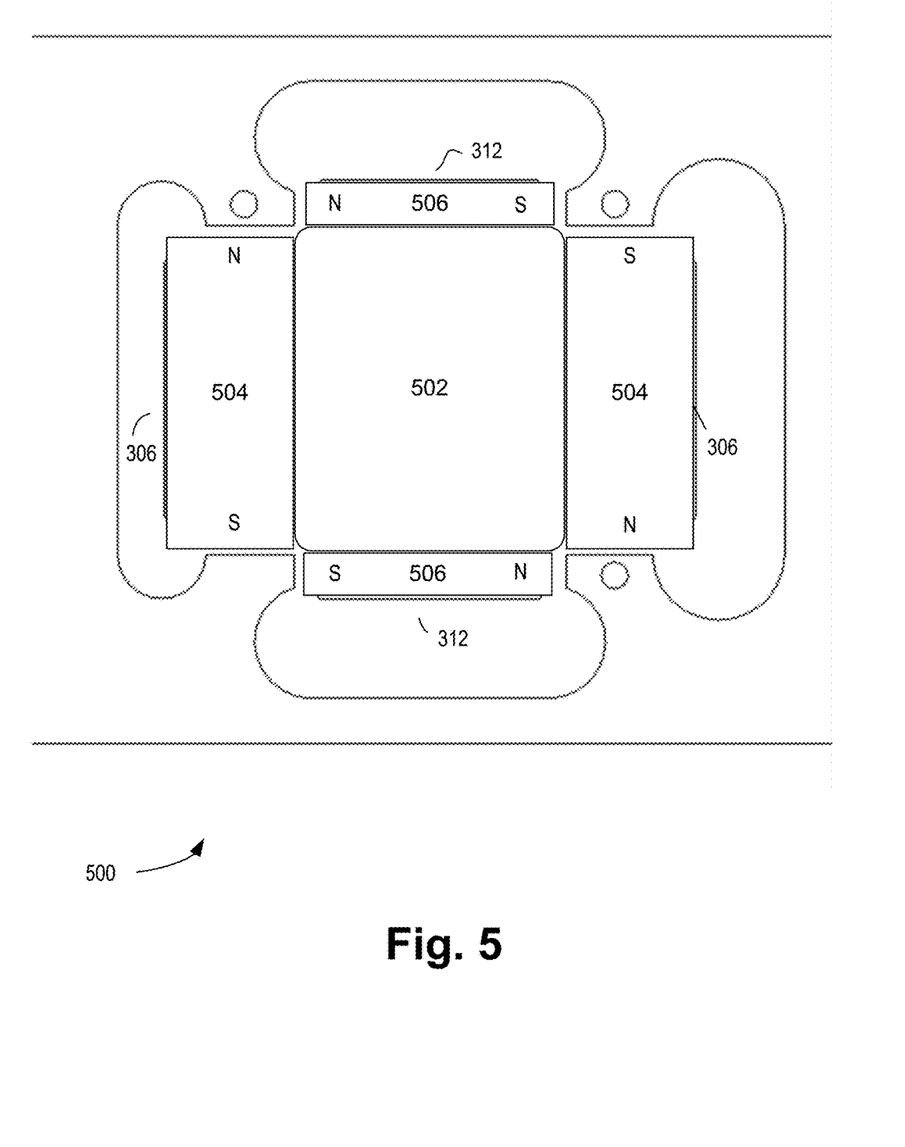
FIG. 5 illustrates an overhead view of an example populated compartment for magnet placement, according to some embodiments.

FIG. 5 illustrates an overhead view of an example populated compartment for magnet placement, according to some embodiments. As shown, chassis compartment 500 includes longer grooves 306 and 312, device 502, and magnets 504 and 506. In some embodiments, device 502 may have rounded corners and may have sides that are slightly longer than the adjacent magnets.

Figure 6:
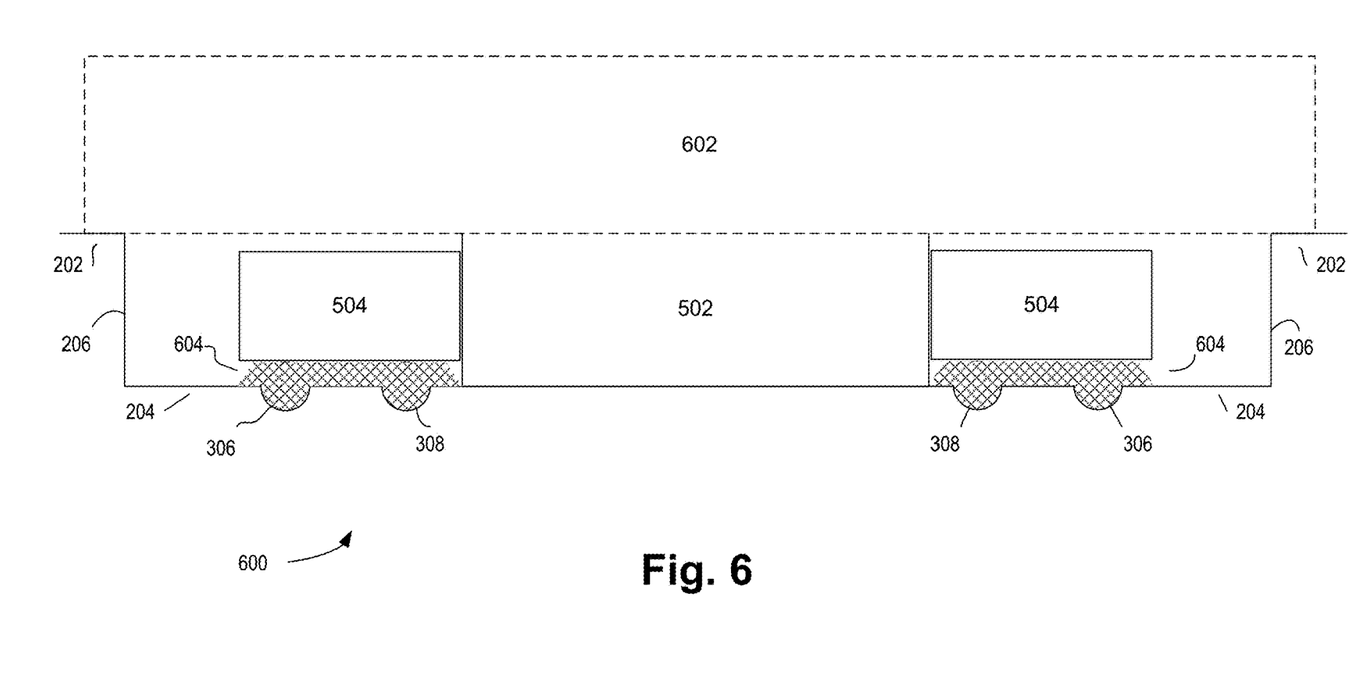
FIG. 6 illustrates a cross-sectional view of an example populated compartment for magnet placement, in accordance with some embodiments.

In some embodiments magnets 504 and 506 may extend as far into slots 210 as longer grooves 306 and 312, respectively. In other embodiments, magnets 504 and 506 may cover and extend beyond longer grooves 306 and 312. In some embodiments, as shown, the magnets may be arranged so that the polarities of neighboring magnet ends are matching, thereby creating repulsive forces FIG. 6 illustrates a cross-sectional view of an example populated compartment for magnet placement, in accordance with some embodiments. As shown, chassis compartment 600 includes raised surface 202, bottom surface 204, compartment walls 206, longer grooves 306, shorter grooves 308, device 502, magnets 504, interfacing components 602, and adhesive 604.

In some embodiments, adhesive 604 is an air cured epoxy that holds magnets 504 in place. Longer grooves 306 and shorter grooves 308 in bottom surface 204 may be completely or partially filled with adhesive 604 to create greater retention of magnets 504 in position next to (or, in some embodiments, in contact with) device 504 and in separation from compartment walls 206. In some embodiments, grooves 306 and 308 extend about 1 mm below bottom surface 204.

In some embodiments, interfacing components 602 are present on top of raised surface 202 and device 502 to interface with device 502. In some embodiments, where device 502 is a MEMS device, interfacing components 602 may provide and/or detect mechanical or electrical forces to or from device 502. For example, interfacing components 602 may provide photons of light to device 502, which may cause device 502 to move or vibrate. These movements or vibrations may in turn be detected by interfacing components 602.

Figure 7:
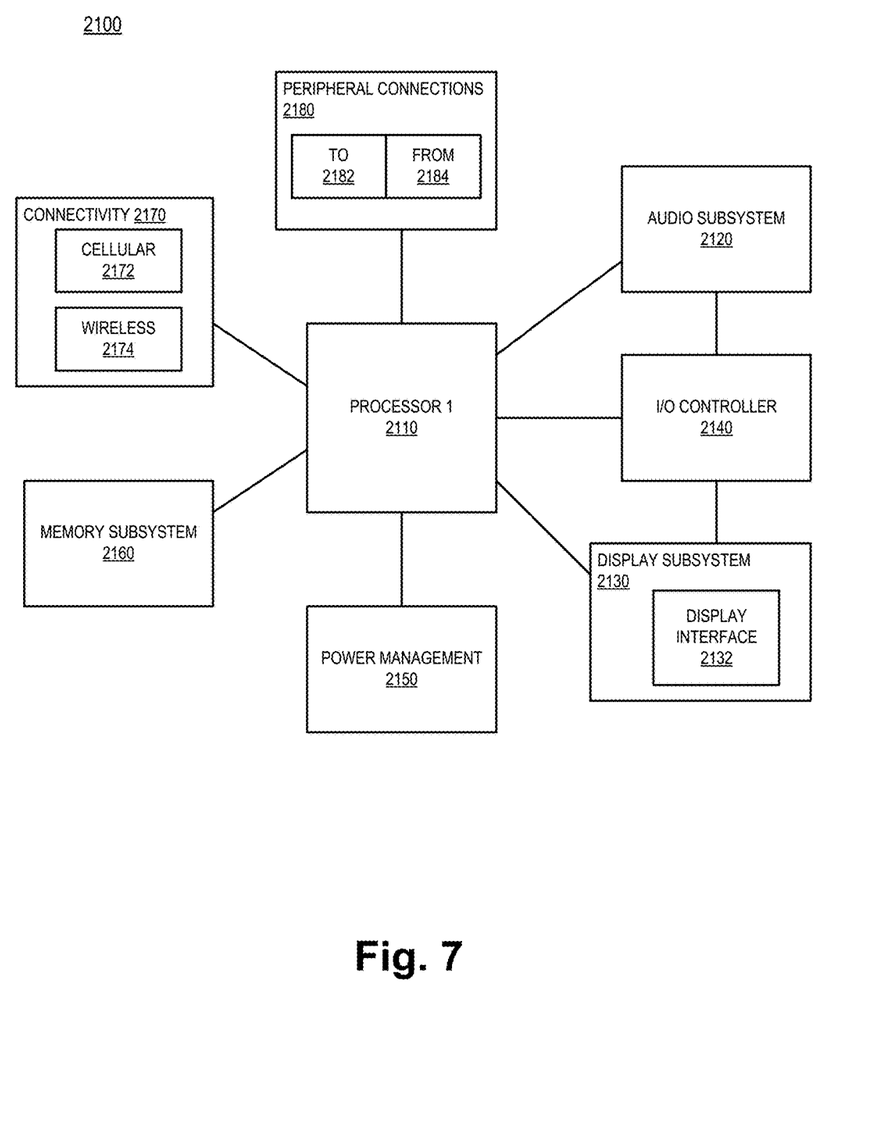
FIG. 7 illustrates a smart device or a computer system or a SoC (System-on-Chip) which includes a compartment for magnet placement, according to some embodiments.

FIG. 7 illustrates a smart device or a computer system or a SoC (System-on-Chip) 2100 which includes a multi-chip package with high density interconnects, according to some embodiments. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100. In some embodiments, some or all components of computing device 2100, for example I/O controller 2140 or peripheral connections 2180, may be housed in a chassis with a compartment for magnet placement as described above.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions. The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking"

connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

For example, an apparatus is provided which comprises: a chassis compartment having a bottom surface and walls orthogonal to the bottom, wherein the chassis compartment comprises: a rectangular opening; and four slots extending outwardly from the rectangular opening, wherein each of the slots comprises: an inner opening having a length coextensive with a side of the rectangular opening; and an outer opening having corresponding ends that extend a length of the outer opening beyond the length of the inner opening.

In some embodiments, the corresponding ends of the outer openings comprise semi-circular ends. In some embodiments, the apparatus further comprises the inner openings of opposite slots having a first depth that is different from an inner opening second depth of the other two slots. In some embodiments, the apparatus further comprises grooves within the bottom surface of the four slots. In some embodiments, the grooves comprise a longer groove connected with two parallel shorter grooves by orthogonal grooves. In some embodiments, the apparatus further comprises the orthogonal grooves of opposite slots having a first length that is different from an orthogonal groove second length of the other two slots. In some embodiments, the apparatus further comprises the longer groove is within the bottom surface of the outer opening of the slots. In some embodiments, the apparatus further comprises shorter groove ends coextensive with longer groove ends. In some embodiments, the apparatus further comprises grooves extending about 1 mm below the bottom surface.

In another example, an apparatus is provided comprising a chassis compartment having a bottom surface and walls orthogonal to the bottom, wherein the chassis compartment comprises: a rectangular opening; and four slots extending outwardly from the rectangular opening, wherein each of the slots comprises: an inner opening having a length coextensive with a side of the rectangular opening; and an outer opening having corresponding ends that extend a length of the outer opening beyond the length of the inner opening; a device in the rectangular opening; and one or more magnet(s) adjacent to the device in each of the slots.

In some embodiments, the apparatus further comprises the magnets extending into the outer openings. In some embodiments, the apparatus further comprises the magnets of opposite slots having a first width that is different from a magnet second width of the other two slots. In some embodiments, the apparatus further comprises the magnets coupled with the bottom surface with an air cured epoxy. In some embodiments, the apparatus further comprises the magnets arranged so that polarities of neighboring magnet ends are differing. In some embodiments, the apparatus further comprises the magnets arranged so that polarities of neighboring magnet ends are matching. In some embodiments, the device comprises a microelectromechanical (MEMS) device. In some embodiments, the magnets comprise rectangular bar magnets. In some embodiments, the magnets are contacting the device.

In another example, a system is provided comprising: a processor; a display subsystem; a wireless communication interface; and an input/output (I/O) device, the I/O device comprising a chassis compartment according to any of the previous examples.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a chassis compartment having a bottom surface and walls orthogonal to the bottom, wherein the chassis compartment comprises:
a rectangular opening;
a device in the rectangular opening, wherein the device comprises a microelectromechanical (MEMS) device; and
four slots extending outwardly from the rectangular opening, wherein each of the slots comprises:
an inner opening having a length coextensive with a side of the rectangular opening;
and an outer opening having corresponding semi-circular ends and a straight side that extend a length of the outer opening beyond the length of the inner opening, further comprising the inner openings of opposite slots having a first depth that is greater from an inner opening second depth of the other two slots.

2. The apparatus of claim 1, further comprising grooves within the bottom surface of the four slots.

3. The apparatus of claim 2, wherein the grooves comprise a longer groove connected with two parallel shorter grooves by orthogonal grooves.

4. The apparatus of claim 3, further comprising the orthogonal grooves of opposite slots having a first length that is different from an orthogonal groove second length of the other two slots.

5. The apparatus of claim 3, further comprising the longer groove is within the bottom surface of the outer opening of the slots.

6. An apparatus comprising:
a chassis compartment having a bottom surface and walls orthogonal to the bottom, wherein the chassis compartment comprises:
a rectangular opening; and
four slots extending outwardly from the rectangular opening, wherein each of the slots comprises:
an inner opening having a length coextensive with a side of the rectangular opening;
and an outer opening having corresponding semi-circular ends and a straight side that extend a length of the outer opening beyond the length of the inner opening, further comprising the inner openings of opposite slots having a first depth that is greater from an inner opening second depth of the other two slots;
a device in the rectangular opening, wherein the device comprises a microelectromechanical (MEMS) device; and
one or more magnet(s) adjacent to the device in each of the slots.

7. The apparatus of claim 1, further comprising the magnets extending into the outer openings.

8. The apparatus of claim 7, further comprising the magnets of opposite slots having a first width that is different from a magnet second width of the other two slots.

9. The apparatus of claim 1, further comprising the magnets coupled with the bottom surface with an air cured epoxy.

10. The apparatus of claim 1, further comprising the magnets arranged so that polarities of neighboring magnet ends are differing.

11. The apparatus of claim 1, further comprising the magnets arranged so that polarities of neighboring magnet ends are matching.

12. A system comprising:
a processor;
a display subsystem;
a wireless communication interface; and
an input/output (I/O) device, the I/O device comprising:
a chassis compartment having a bottom surface and walls orthogonal to the bottom,
wherein the chassis compartment comprises:
a rectangular opening; and four slots extending outwardly from the rectangular opening, wherein each of the slots comprises:
an inner opening having a length coextensive with a side of the rectangular opening;
and an outer opening having corresponding semi-circular ends and a straight side that extend a length of the outer opening beyond the length of the inner opening, further comprising the inner openings of opposite slots having a first depth that is greater from an inner opening second depth of the other two slots;
a MEMS device in the rectangular opening; and
one or more magnet(s) adjacent to the device in each of the slots.

13. The system of claim 12, further comprising grooves within the bottom surface of the four slots, wherein the grooves comprise a longer groove connected with two parallel shorter grooves by orthogonal grooves.

14. The system of claim 13, further comprising the longer groove is within the bottom surface of the outer opening of the slots.

15. The system of claim 12, further comprising the magnets of opposite slots having a first width that is different from a magnet second width of the other two slots.

16. The system of claim 12, further comprising the magnets arranged so that polarities of neighboring magnet ends are differing.

* * * * *